United States Patent [19]

Hobson

[11] 4,037,513

[45] July 26, 1977

[54] COTTER PIN

[75] Inventor: Stephan C. Hobson, Buffalo Grove, Ill.

[73] Assignee: Portec, Inc., Oak Brook, Ill.

[21] Appl. No.: 720,401

[22] Filed: Sept. 3, 1976

[51] Int. Cl.$^2$ .............................................. F16B 21/14
[52] U.S. Cl. .................................. 85/8.3; 24/201 LP; 24/213 B
[58] Field of Search ................. 85/8.3, 8.1, 7, 5 R, 85/5 E, 5 M, 80; 24/73 SM, 213 B, 213 R, 214, 201 LP; 151/5, 6

[56] References Cited

U.S. PATENT DOCUMENTS

| 362,548 | 5/1887 | Smith | 85/8.3 |
|---|---|---|---|
| 500,162 | 6/1893 | Smith | 85/8.1 |
| 2,192,359 | 3/1940 | Lombard | 24/213 B X |
| 2,315,211 | 3/1943 | Kost | 24/213 B X |
| 2,391,298 | 12/1945 | Davis | 85/80 X |
| 2,549,459 | 4/1951 | Guest | 85/8.3 |

*Primary Examiner*—Ramon S. Britts

*Attorney, Agent, or Firm*—Hill, Gross, Simpson, Van Santen, Steadman, Chiara & Simpson

[57] ABSTRACT

Heavy-duty cotter pin for retaining retainer member in position. The legs of the cotter pin each have an integrally formed locking arm extending angularly outwardly therefrom, locking the cotter pin in position without forcefully spreading or deforming the legs. The legs of the cotter pin are biased outwardly relative to each other and extend from a bight portion of the pin at equal angles with respect to the longitudinal center line of the pin. The legs are moved toward and laterally of each other to enter the hole of a pin or other retainer member and clear the locking arms from the hole. The locking arms are maintained in their angular outwardly extending position, both during placing of the cotter pin in a hole and removing the cotter pin from the hole. The pin cannot be released except by flexing the legs toward each other against their spring bias and then moving them laterally in opposite directions to clear the locking arms from the internal periphery of the hole and to accommodate ready removal thereof, without deforming the legs.

4 Claims, 6 Drawing Figures

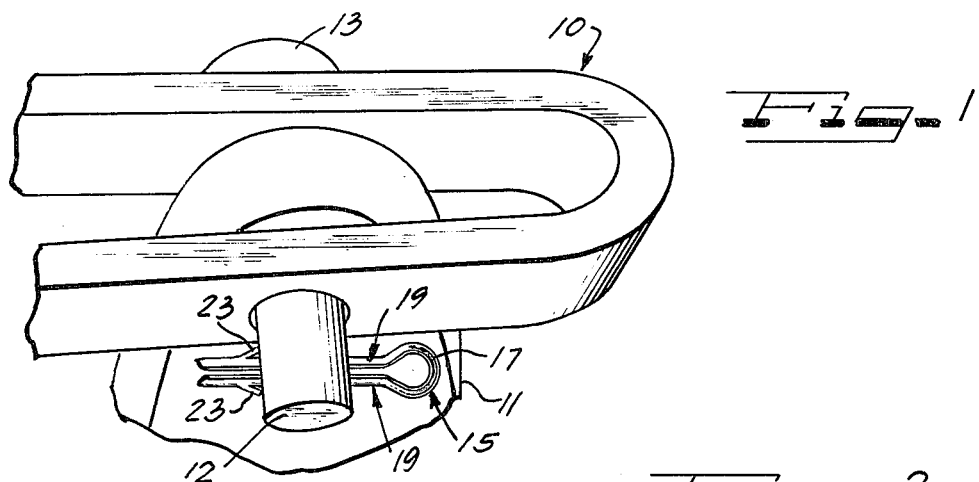
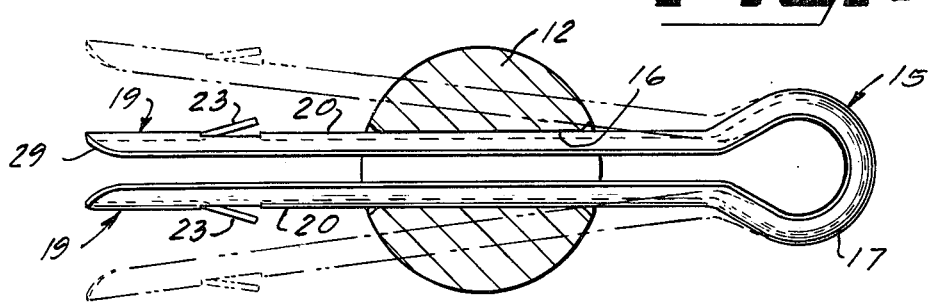
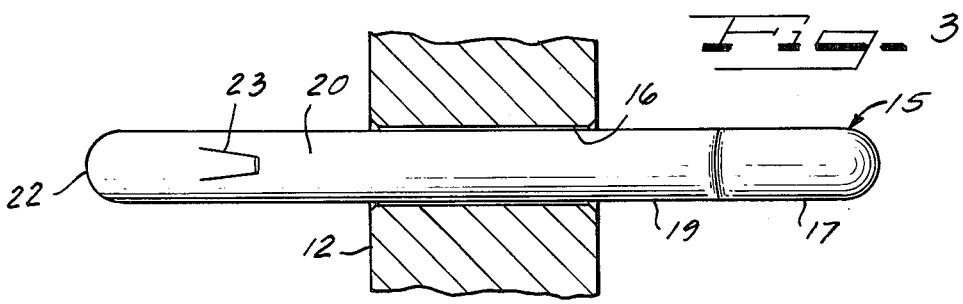
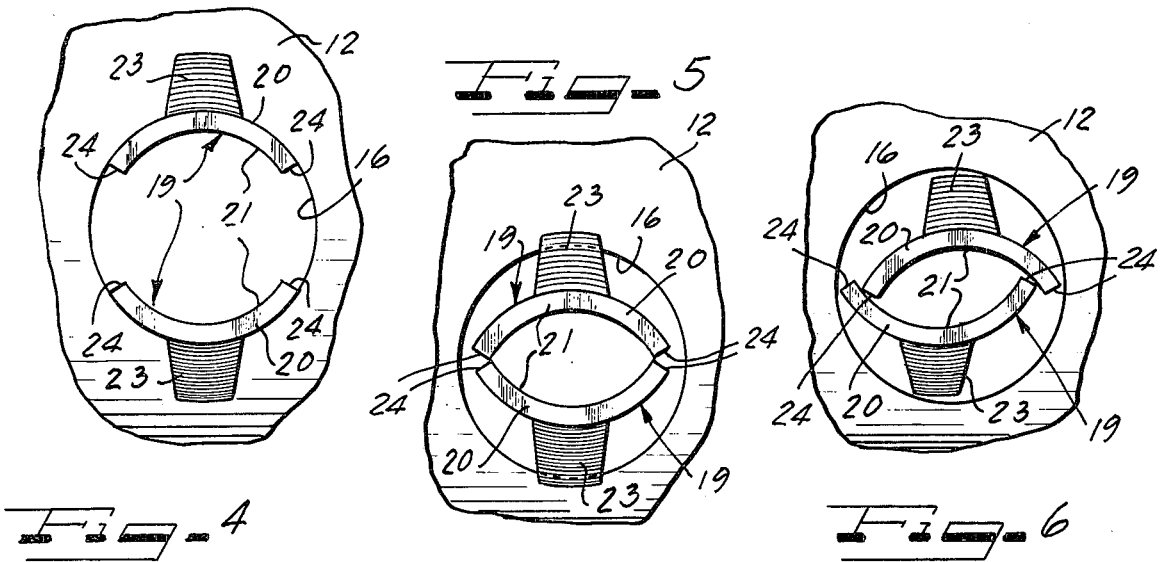

COTTER PIN

FIELD OF THE INVENTION

Heavy-duty cotter pin for relatively large diameter holes in a pin or other retaining member, such as found in Class 85/5e, 8.1, and 8.3.

PRIOR ART, SUMMARY AND ADVANTAGES OF INVENTION

The U.S. Pat. No. 2,121,425 to Cooke shows a cotter pin of a type in which the legs of the pin are sprung apart by a wedge and the like and deformed by the wedge to retain the cotter pin in position in a stud or pin. This patent also shows a retainer for the pin which fits between the legs of the pin and has locking arms lanced out of its opposite sides to retain the retainer member to the cotter pin. These locking arms cooperate with a wedge-shaped spreading section spreading the legs of the cotter pin. The locking arms project outwardly of the retainer a greater extent than the diameter of the cotter pin hole and are resiliently pressed toward each other during their passage through the cotter pin hole and rely upon their resiliency to move outwardly and lock the cotter pin in position when the fingers are free of the hole.

The U.S. Pat. No. 1,172,813 to McCoy shows a cotter pin in which the legs of the pin abut each other when in a closed position and are tapered inwardly as they approach the end of the pin, to form inwardly inclined shoulders towards the ends of the legs bearing into engagement with a nut or other member, to be locked in position.

U.S. Pat. Nos. 1,913,555; 1,171,740; 937,402; 443,260; 270,410 and 140,715 also show various forms of locking means for locking a cotter pin or other type of pin to its hole.

The present invention improves upon the cotter pins of the prior art references just mentioned in that the legs of the cotter pin are not deformed beyond their normal state when locking the pin in position and locking fingers lanced from the legs of the cotter pin normally engage the member to be locked by the cotter pin even when the legs are pressed together in alignment with each other, but are readily released by pressing the legs of the cotter pin toward each other and then moving one leg laterally in one direction and the other leg in an opposite direction to accommodate removal of the cotter pin from its hole without deforming the legs of the pin or the locking means therefor. The cotter pin, therefore, cannot work loose even though the legs may inadvertently be moved towards each other by external pressures thereon.

An advantage of the invention, therefore, is in the provision of a heavy-duty cotter pin for relatively large diameter holes, which may be locked in position or removed from its hole, without bending the legs or the locking means for the cotter pin.

A further advantage of the invention is in the simplicity and positiveness of the cotter pin and locking means therefor in which the cotter pin is so arranged as to lock a pin or other device in position without deforming the cotter pin, and in which the pin cannot be removed without moving the legs of the cotter pin toward each other and laterally relative to each other.

A still further advantage and object of the invention is the provision of a new and improved cotter pin having legs conformable with a round hole and yieldably biased outwardly relative to each other in which the cotter pin and legs may be made from a yieldable metal and the legs have concave inner surfaces formed concentrically with the outer surfaces of the legs, in which the locking means comprises locking fingers lanced from the legs and extending in diametrically opposed relation and outwardly of the outer concave surfaces of the legs, and accommodate insertion of the pin by compressing the legs toward each other and accommodating partial nesting of the legs relative to each other with no deformation of the locking fingers.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a generally perspective view of a yoke and lever in which the lever is pivoted to the yoke by a pin, and the pin is held to the yoke by a cotter pin constructed in accordance with the principles of the present invention;

FIG. 2 is a sectional view taken through the fastening member or pin and showing the cotter pin in a locked position in an apertured portion of the fastening member;

FIG. 3 is a view somewhat similar to FIG. 2, but showing the cotter pin in plan view in order to more clearly show the locking fingers;

FIG. 4 is an end view of the cotter pin showing the legs of the cotter pin in their extended positions, with the pin locked to the hole in the fastening member;

FIG. 5 is a view somewhat similar to FIG. 4, but showing the legs compressed and illustrating how the locking fingers retain the pin in position in its fastening member when compressed; and FIG. 6 is a view showing the legs of the cotter pin moved together and laterally relative to each other to partially nest the legs and clear the locking fingers from hole in the fastening member.

DESCRIPTION OF THE PREFERRED EMBODIMENT OF INVENTION

In FIG. 1 of the drawings, I have shown for illustrative purposes, a member 10, which may be a yoke, pivoted to another member 11, which may be a lever, by a pivot member, shown as being a pin 12 having a head 13. The pivot or fastening member may perform various uses, and in the drawings is shown as held in position by a cotter pin 15 constructed in accordance with the principles of the present invention. The fastening member or pin 12 has a transversely extending round apertured portion or hole 16 formed therein through which the cotter pin 15 fits, as shown in FIGS. 2 and 3.

The cotter pin 15 includes a bight portion 17 having concave legs 19 extending therefrom. The legs 19, as shown in FIGS. 4, 5 and 6, have an outer periphery 20 formed on the arc of a circle and struck from a radius slightly smaller than the radius of the apertured portion 16, to accommodate insertion and removal of the cotter pin from apertured portions 16 of various diameters. Opposite sides 24 of said legs are spaced from each other when inserted in an apertured portion to accommodate movement of said legs towards and from each other and laterally of each other, when compressed.

The legs 19 are biased outwardly when in an uncompressed free state, and are moved toward and laterally of each other when placing the cotter pin in the apertured portion 16 or removing the pin therefrom. While the outward bias of the legs may vary, it has been found that with the average heavy-duty cotter pin fitting through a relatively large diameter hole, where the legs maintain a 15° position, a convenient bias is obtained to enable the legs 19 to be readily compressed or moved toward each other and inserted into the apertured portion 16. The bias, of course, may depend upon the size of the cotter pin and the member to be held in position thereby. The legs 19 should be sufficiently resilient to enable ready compression of said legs for insertion of the cotter pin into its apertured portion. The leading ends of the legs 19 are herein shown as being curved, as indicated by reference number 22, to facilitate the insertion of a cotter pin in an apertured portion, as said legs are moved towards each other against their bias.

The locking means for the cotter pin locking the pin to its securing member and apertured portion are shown as being in the form of locking fingers and may be lanced out of the legs 19 in diametrically opposed relation with respect to each other, and are shown in FIG. 3 as being larger at their base than at their outer ends, although they may be of the same width at their base as at their outer ends for certain conditions, and in all cases, are formed integrally with the legs 19 and have a thickness equal to the distance between the internal and external arcuate surfaces of said legs.

The locking fingers 23 usually extend at the same angular relation with respect to their respective legs at angles accommodating insertion of the cotter pin in the apertured portion 16, as the concave legs are partially nested in each other, but preventing removal of the cotter pin when the legs 19 are pressed together in alignment with each other. The cotter pin, thus, will not come loose when the legs 19 are accidentally pressed toward each other, and may only be removed by intentionally moving the two legs 19 laterally of each other in opposite directions, to partially nest said legs to partially overlap at their ends, as shown in FIG. 6 and then easily sliding the cotter pin from the apertured portion 16.

As previously mentioned, the arcs of the outer peripheries of the legs 19 are struck from lesser diameters than the diameter of the apertured portion through which the pin fits to accommodate insertion of the pin by merely pressing the two legs together and partially nesting the legs relative to each other and then sliding the cotter pin through said apertured portion. Moreover, with the pin shown, the cotter pin is locked in position by the locking arms 23 with no deformation of the legs 19 or locking arms 23, except by the bias of said legs as they engage the inner periphery of the apertured portion 16.

The cotter pin of the present invention, therefore, avoids the necessity of spreading the legs to lock the cotter pin to its apertured portion and further avoids the necessity of straightening the legs when it is desired to remove the pin, which oftentimes destroys the efficiency of the cotter pin and makes it necessary to use a new pin each time it is desired to remove and replace the fastening member or pin 12. This is particularly advantageous when a cotter pin of ⅜ inch or larger is used and provides a locking connection preventing the cotter pin from working out of its apertured portion, even if the legs should be moved toward each other into a position like that shown in FIG. 5.

It will be apparent to those skilled in the art that many modifications and variations may be effected without departing from the spirit and scope of the novel concepts of the present invention.

I claim as my invention:

1. In a cotter pin and in combination with a fastening member having a transversely extending apertured portion having a circumferential inner periphery with said cotter pin being positioned within said apertured portion, said cotter pin having a bight portion at one end and opposed legs extending from said bight portion and biased outwardly relative to each other to normally extend at predetermined equal angles with respect to the longitudinal center of the cotter pin, said legs of said cotter pin being spaced apart throughout their length in said apertured portion and being adapted to fit through apertured portions of various diameters by compressing said legs toward each other, said legs having outer ends projecting beyond said fastening member and a locking arm extending outwardly of each of said legs adjacent the outer ends of said legs and formed integrally therewith and having free ends facing the fastening member and retaining said cotter pin in position in said fastening member by the bias of said legs, without deforming the free ends of said legs the dimension between the free ends of said locking arms when said legs are compressed into diametrically opposed engagement with each other being greater than the maximum transverse dimension of said apertured portion whereby said locking arms prevent accidental removal of the cotter pin should said legs be inadvertently pressed into engagement with each other, said outer surfaces of said legs having a shape corresponding to the shape of the apertured portion, and the inner surfaces of said legs being concave throughout the length thereof including the outer ends, said locking arms being formed integrally of said legs and said locking arms being released to accommodate removal of the cotter pin from said apertured portion by pressing said legs together and then moving said legs laterally of each other in opposite directions and partially nesting the ends of said legs relative to each other to clear the ends of said locking arms from the apertured portion and thereby permit ready removal of the cotter pin.

2. The cotter pin of claim 1 wherein said locking arms are lanced outwardly of said legs in diametrically opposed relation with respect to each other, and are of a greater width at their junctures with said legs than at their free ends.

3. The cotter pin of claim 1 wherein the apertured portion is of a circular cross section and the external peripheries of said legs are formed on the arcs of a circle, substantially equal to the diameter of the apertured portion, and said locking arms are diametrically opposed and lanced out of said legs in diametrically opposed relation with respect to each other.

4. The cotter pin of claim 3 wherein the unrestricted outward bias of said legs is in the order of 15° to enable said legs to compensate for holes of varying diameters.

* * * * *